Figure 1:
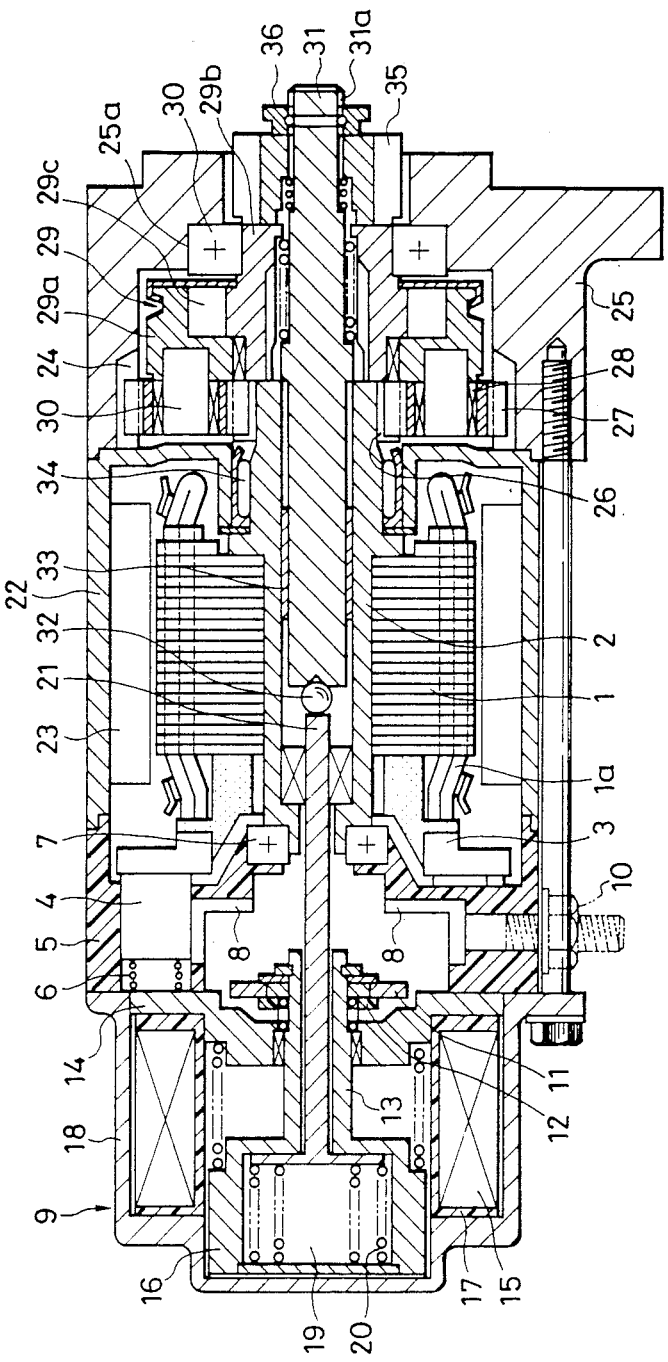
Figure 2:
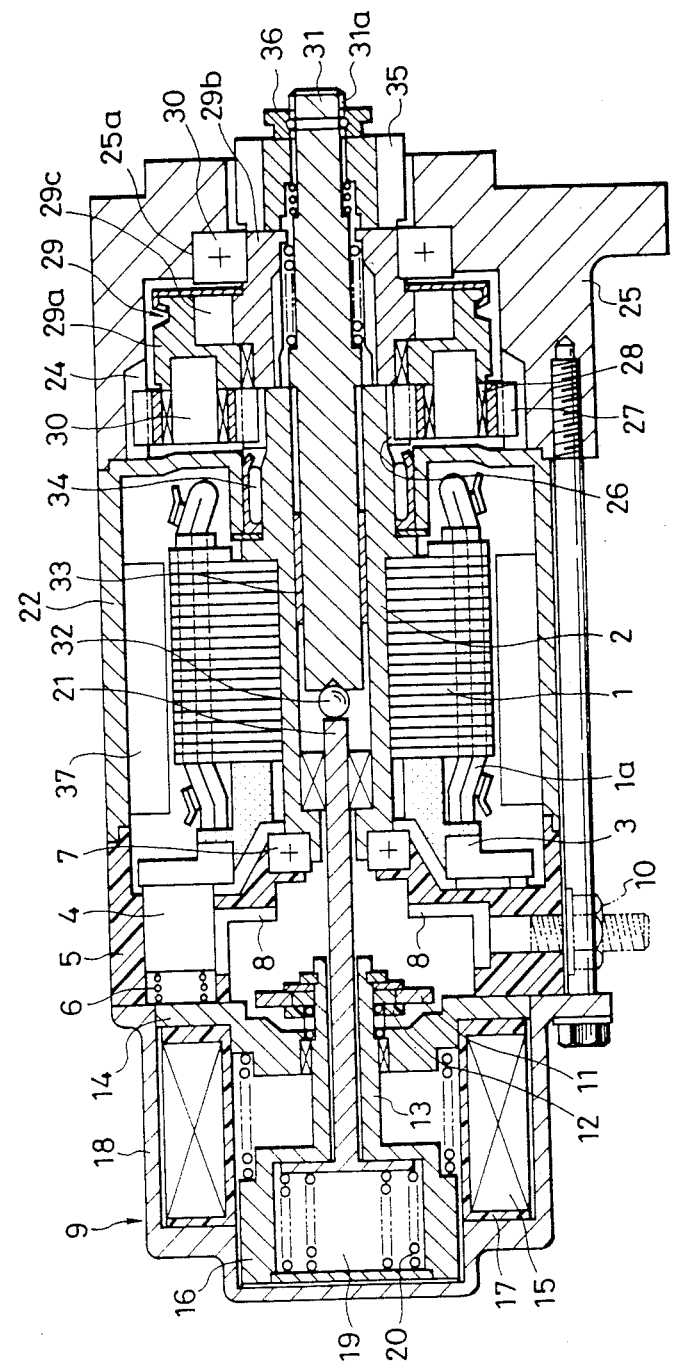

United States Patent [19]

Tanaka

[11] Patent Number: 4,816,712
[45] Date of Patent: Mar. 28, 1989

[54] THRUST COMPENSATION FOR FLAT-COMMUTATOR STARTER

[75] Inventor: Toshinori Tanaka, Hyogo, Japan

[73] Assignee: Mitsubishi Denki Kabushiki Kaisha, Tokyo, Japan

[21] Appl. No.: 113,307

[22] Filed: Oct. 28, 1987

[30] Foreign Application Priority Data

Oct. 28, 1986 [JP] Japan .................. 61-257424

[51] Int. Cl.$^4$ .............. H01R 39/06; H02K 13/00
[52] U.S. Cl. ........................... 310/237; 310/80
[58] Field of Search ............... 310/80, 191, 209, 229, 310/233, 237, 261

[56] References Cited

U.S. PATENT DOCUMENTS 4,347,452  8/1982  Imahashi .................. 310/80

FOREIGN PATENT DOCUMENTS 1131789  6/1962  Fed. Rep. of Germany ...... 310/209
626470   9/1978  U.S.S.R.

Primary Examiner—Patrick R. Salce
Assistant Examiner—D. L. Rebsch
Attorney, Agent, or Firm—Sughrue, Mion, Zinn, Macpeak & Seas

[57] ABSTRACT

A starter of a flat commutator type comprises an electric motor armature on a rotary shaft, a commutator extending in a direction substantially perpendicular to the axial direction of the rotary shaft, and brushes pushing the commutator in the axial direction of the rotary shaft. The center of the field of the electric motor is positional away from the center of the armature in the axial direction thereof, in a direction opposite to that of the pushing force of the brushes.

7 Claims, 3 Drawing Sheets though small force oriented toward the magnetic center of the permanent magnet 37 acts on the rotary shaft 2 and the armature 1, a force oriented forward and acting on the rotary shaft and the armature due to the action of the brushes 4 pushed forward by the brush springs 6 is offset so that the forward thrust applied to the rotary shaft 2 and the armature 1 is decreased to reduce a torque loss at a thrust bearing.

Figure 3:
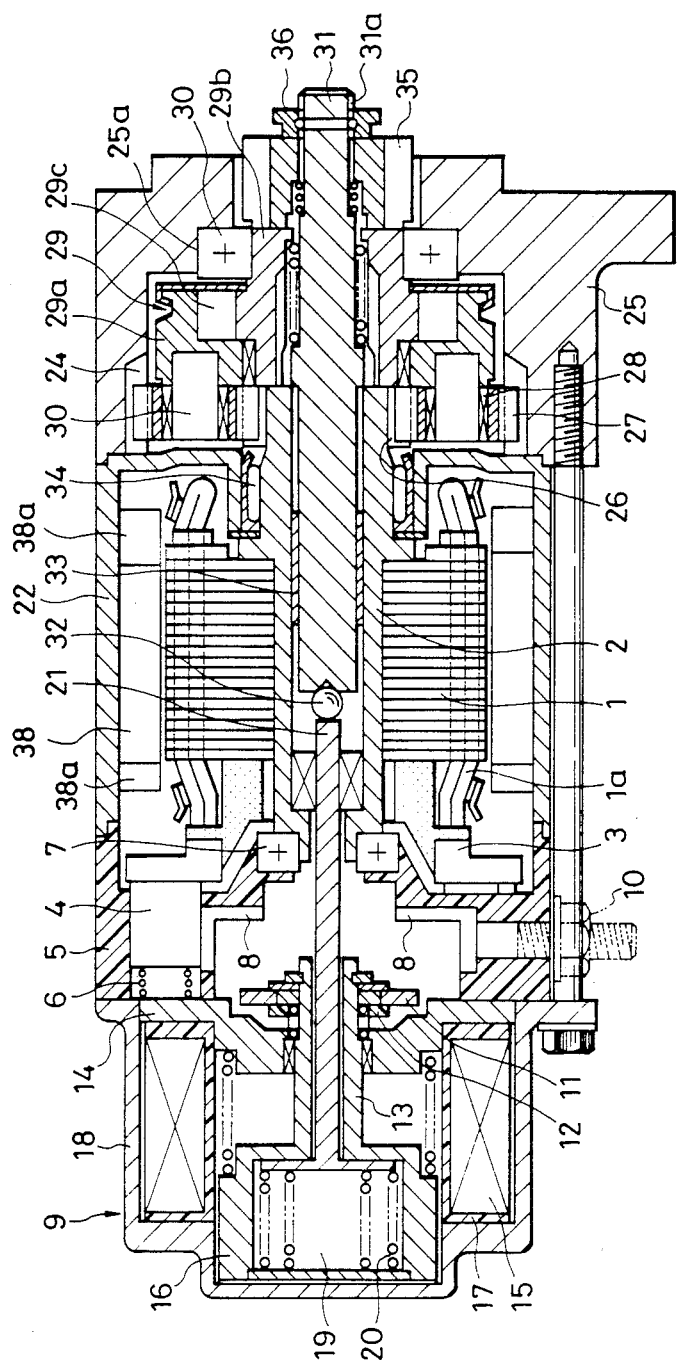

FIG. 3 shows a sectional view of a starter of the flat commutator type, which is another embodiment of the present invention. The portions (whose reference symbols are from 1 to 36) of the starter shown in FIG. 3 are the same as those (whose reference symbols are from 1 to 36) of the conventional starter shown in FIG. 1 and therefore are not described in detail hereinafter. In the starter shown in FIG. 3, a yoke 38 is made with a thicker portion 38a on the front side thereof and a thinner portion 38b on the rear side thereof. A permanent magnet 39 is secured to the inside circumferential surface of the yoke 38 of the starter to act as the field of the DC motor thereof. Since the thickness of the thicker portion 38a of the yoke 38 is larger than that of the thinner portion 38b thereof, the reluctance of the thicker portion is smaller than that of the thinner portion. For that reason, the magnetic center of the permanent magnet 39 in the axial direction of the starter is displaced from the center of the armature 1 in the axial direction thereof toward the thicker portion 38a of the yoke 38, namely, in a direction opposite to the direction of the forward thrust of the brushes 4.

When electricity is applied to the electromagnetic switch 9 of the starter shown in FIG. 3, the armature 1 is rotated and the rotary output shaft 31 is moved forward so that the pinion 35 is engaged with the ring gear for the engine to start the engine, in the same manner as the conventional starter shown in FIG. 1.

Since the magnetic center of the permanent magnet 39 of the starter shown in FIG. 3 is displaced from the center of the armature 1 in the axial direction thereof toward the thicker portion 38a of the yoke 38, the armature and the rotary shaft 2 thereof are always attracted rearward during the rotation of the armature. For that reason, although a small force oriented toward the magnetic center of the permanent magnet 39 acts on the rotary shaft 2 and the armature 1, a force oriented forward and acting on the rotary shaft and the armature due to the action of the brushes 4 pushed forward by the brush springs 6 is offset so that the forward thrust applied to the rotary shaft 2 and the armature 1 is decreased to reduce a torque loss at a thrust bearing.

As described above, the starter of the flat commutator type provided in accordance with the present invention is constituted in such a manner that the magnetic center of the field of the motor of the starter in the axial direction thereof is displaced from the center of the armature of the motor in the axial direction thereof in the direction opposite to the direction of the pushing force of brushes so that a force oriented toward the magnetic center of the field is caused when the armature is rotated under the application of the electricity thereto. As a result, the pushing force of the brushes to the flat commutator of the starter is offset so that the thrust load upon the rotary shaft of the armature is decreased, thereby the torque loss is reduced while the starter is in action.

What is claimed is:

1. A starter of a flat commutator type, comprising:

a DC motor including an armature and a rotary shaft supporting the armature in a central portion thereof;

a flat commutator provided on the rotary shaft adjacent to the armature;

brushes resiliently urged against said flat commutator with a pushing force oriented axially of the rotary shaft in a predetermined direction; and field magnet means surrounding said armature and establishing a magnetic field, said field magnet means having a magnetic center displaced from a center of said armature in a direction opposite to said predetermined direction, whereby said armature and rotary shaft are urged by the interaction of said field magnet means and said armature in a direction opposite to said predetermined direction upon energization of said motor, to offset the axial pushing force of the brushes.

2. A starter according to claim 1, wherein said field magnet means comprises a yoke and a permanent magnet secured to an inner circumferential surface of said yoke, said permanent magnet being offset in said opposite direction from the center of said armature.

3. A starter according to claim 1, wherein said field magnet means comprises a yoke having a thicker portion opposite said predetermined direction from a thinner portion and a permanent magnet secured to an inner circumferential surface of said yoke and extending across both said thicker and thinner portions of said yoke, whereby a magnetic center of said permanent magnet is offset in said opposite direction from the center of said armature.

* * * * * pushing forces of the brush springs 6 are offset by the backward attractive force on the armature 1 and the rotary shaft 2 thereof so that the thrust load upon a thrust bearing is decreased. As a result, the torque loss of the starter is reduced.

FIG. 3 shows another embodiment which is also a starter of the flat commutator type, in which the field of a DC motor is composed of main magnetic poles 38a and auxiliary magnetic poles 38b located adjacently to the main magnetic poles 38a in the direction inverse to that of the rotation of the armature of the DC motor. The main magnetic poles 38a are constituted by a permanent magnet. The auxiliary magnetic poles 38b are constituted by iron pieces secured adjacently to the permanent magnet. The portions (whose reference symbols are from 1 to 36) of the starter shown in FIG. 3 are the same as those (whose reference symbols are from 1 to 36) of the conventional starter shown in FIG. 1 and therefore not described in detail hereinafter. The magnetic center lines of the main magnetic poles 38a extend through the center of the armature 1 of the starter in the axial direction thereof shown in FIG. 3, but the magnetic center lines of the auxiliary magnetic poles 38b extend off the center of the armature 1 in the axial direction thereof and are displaced therefrom toward the brushes 4. As a result, when the total load upon the starter is heavy, an electrical current flowing through the armature coil 1a is also heavy and the magnetic flux of the field of the starter is therefore large in quantity so that a force attracting the armature 1 toward the brushes 4 is caused and offsets the pushing forces of the brush springs 6. For that reason, the forward thrust load upon the starter is decreased so that the torque loss thereof is reduced.

When the total load upon the starter is light, the electrical current flowing through the armature coil 1a is small and the magnetic flux of the field of the starter is therefore small in quantity. Accordingly, the backward attractive force caused by the auxiliary magnetic poles 38b is weak so that the forward thrust load upon the starter is relatively heavy. For that reason, a braking action is caused so that the starter is prevented from excessively rotating. In other words, the rotative loss of the starter is decreased when the total load thereupon is heavy, and the excessive rotation of the starter is prevented by the braking action of the thrust load thereupon when the total load thereupon is light.

Although the field in each of the above-described embodiments is constituted by the permanent magnet, the present invention is not confined thereto but may be otherwise embodied to provide a field constituted by a core and a coil wound thereon, to produce the same effect as the embodiments.

As described above, according to the present invention, the magnetic center of the field of the motor of the starter is displaced from the center of the armature of the motor in the axial direction thereof in the direction inverse to that of the pushing force of the brushes, so that the thrust load is reduced when the armature is rotated. Accordingly, the torque loss is reduced while the starter is in action.

What is claimed is:

1. A starter of a flat commutator type, comprising:
   an armature of an electric motor;
   a rotary shaft of said armature;
   a commutator extending in a direction substantially perpendicular to the axial direction of said rotary shaft; and
   brushes pushing said commutator in the axial direction of said rotary shaft; and
   means for producing a magnetic field of said electric motor, said field producing means being positioned relative to said armature in a direction opposite to that of the pushing force of said brushes so that the produced field offsets the pushing force of said brushes.

2. A starter as claimed in claim 1, wherein said field producing means comprises a permanent magnet.

3. A starter as claimed in claim 1, wherein said field producing means comprises a core and a coil wound thereon.

4. A starter as claimed in claim 1, wherein said field producing means comprises main magnetic poles and auxiliary magnetic poles, and wherein the magnetic center lines of said main magnetic poles extend through the center of said armature in the axial direction thereof, and wherein the magnetic center lines of said auxiliary magnetic poles extend in a direction opposite to that of the pushing force of said brushes.

5. A starter as claimed in claim 4, in which said main magnetic poles comprises a permanent magnet and said auxiliary magnetic poles comprises iron pieces secured adacently to said permanent magnet.

6. A starter as claimed in claim 2, wherein said permanent magnet includes main magnetic poles and auxiliary magnetic poles, wherein the magnetic center lines of said main magnetic poles extend through the center of said armature in the axial direction thereof, and wherein the magnetic center lines of said auxiliary magnetic poles extend in a direction opposite to that of the pushing force of said brushes.

7. A starter as claimed in claim 6, wherein said auxiliary magnetic poles comprises iron pieces secured adjacent to said main magnetic poles of said permanent magnet.

* * * * *